US012662147B2

(12) United States Patent
    Doshi et al.

(10) Patent No.:     US 12,662,147 B2
(45) Date of Patent:         Jun. 23, 2026

(54) CORRECT DRIVING DIRECTION FROM LANE MARKED ARROWS

(71) Applicant: Valeo Schalter und Sensoren GmbH, Bietigheim-Bissingen (DE)

(72) Inventors: Deep Doshi, Troy, MI (US); Sree Harsha Chowdary Gorantla, Troy, MI (US); Jaime Almeida, Troy, MI (US)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 105 days.

(21) Appl. No.: 18/405,108

(22) Filed: Jan. 5, 2024

(65)         Prior Publication Data
     US 2025/0222947 A1      Jul. 10, 2025

(51) Int. Cl.
     *B60W 50/14*         (2020.01)
     *G06T 5/50*          (2006.01)
                    (Continued)

(52) U.S. Cl.
     CPC ............... *B60W 50/14* (2013.01); *G06T 5/50* (2013.01); *G06T 5/80* (2024.01); *G06T 7/11* (2017.01);
                    (Continued)

(58) Field of Classification Search
     CPC . B60W 50/14; G06T 5/50; G06T 5/80; G06T 7/11; G06T 2207/20221; G06V 20/588
     See application file for complete search history.

(56)                References Cited

U.S. PATENT DOCUMENTS 9,459,113 B2    10/2016  Zhang
2011/0081201 A1*  4/2011  Croce ..................... E01F 9/529
                                        404/16
                    (Continued)

FOREIGN PATENT DOCUMENTS

CN         107886035 B      6/2020
KR      20150103813 A   *  9/2015   ............ B60W 30/06

OTHER PUBLICATIONS

"An Inverse Perspective Mapping-Based Approach for Generating Panoramic Images of Pipe Inner Surfaces", Yoo et al., Sensors 2023, published Jun. 6, 2023 (Year: 2023).*
                    (Continued)

*Primary Examiner* — Kito R Robinson
*Assistant Examiner* — Tanya C Sienko
(74) *Attorney, Agent, or Firm* — Valeo Schalter und Sensoren GmbH

(57)                ABSTRACT

The invention covers a method performed by a computing device configured to detect a lane direction in a parking zone being navigated by a vehicle. The method uses an image capture device to obtain an image of an environment surrounding the vehicle that includes an arrow marking on a ground surface of the parking zone. The method then generates a top-down image, including the arrow marking, of the environment surrounding the vehicle, performs an image analysis of the top-down image to determine an arrow direction of the arrow marking. The method then detects the lane direction of a lane occupied by the vehicle based on the determined arrow direction from the image analysis results, generates and provides an output indicating the lane direction of the lane occupied by the vehicle, and moves the vehicle in that direction.

18 Claims, 9 Drawing Sheets

(51) Int. Cl.
      *G06T 5/80*     (2024.01)
      *G06T 7/11*     (2017.01)
      *G06V 20/56*    (2022.01)

(52) U.S. Cl.
      CPC .. *G06V 20/588* (2022.01); *G06T 2207/20221*
                                                 (2013.01)

(56)                References Cited

U.S. PATENT DOCUMENTS

| | | | |
|---|---|---|---|
| 2016/0307052 A1 | 10/2016 | Han et al. | |
| 2020/0258391 A1 * | 8/2020 | Raichelgauz | G06N 3/045 |
| 2022/0219716 A1 * | 7/2022 | McAlister | G08G 1/097 |
| 2024/0428684 A1 * | 12/2024 | Scott | G06V 20/586 |

OTHER PUBLICATIONS

"A Simple Algorithm for Identifying the Direction of Arrows" Y.Xu et al., IOP Conf. Series: Journal of Physics Conf. Series 1176 (2019) 052053 (Year: 2019).*
"Identify directions of arrows in an image" posted Mar. 31, 2014, answered Mar. 31, 2014 https://www.mathworks.com/matlabcentral/answers/123812-identify-directions-of-arrows-in-a-image (Year: 2014).*
Machine translation of KR-20150103813 downloaded from Espacenet Jun. 12, 2025 (Year: 2025).*
"Detecting Symbols on Road Surface of Mapping and Localization using OCR" by M. Schreiber, et al., IEEE Int. Conf. Intelligent Transportation Systems, 2014, pp. 597-602 (Year: 2014).*
International Search Report and Written Opinion for PCT/US2024/060312, Completed Mar. 14, 2025, Mailed Apr. 9, 2025, All together 11 Pages.

* cited by examiner

200

200

200

200

600     604

700     708   716    704

712         720

CORRECT DRIVING DIRECTION FROM LANE MARKED ARROWS

TECHNICAL FIELD

The present disclosure relates to systems and methods for assisting vehicle navigation in parking zones.

BACKGROUND

Modern automotive vehicles are typically equipped with a variety of sensors. Whether internal or external to the passenger cabin of the vehicle, these sensors provide the foundation for driving automation and vehicle autonomy. Vehicles with autonomous or semi-autonomous driving or driver-assistant features use these sensors and associated computer vision technology to assist navigation within parking zones and provide parking assistance. Parking assist systems can help drivers navigate through parking zones and park vehicles in parking spaces, either automatically or by providing guidance to the driver.

SUMMARY

A method performed by a computing device configured to detect a lane direction in a parking zone being navigated by a vehicle includes capturing, using an image capture device, at least one image of an environment surrounding the vehicle that includes an arrow marking on a ground surface of the parking zone, generating a top-down image, including the arrow marking, of the environment surrounding the vehicle based on the captured at least one image, performing an image analysis of the top-down image to determine an arrow direction of the arrow marking, detecting, based on results of the image analysis, the lane direction of a lane occupied by the vehicle based on the determined arrow direction, generating and providing an output indicating the lane direction of the lane occupied by the vehicle.

Other aspects of the disclosed embodiments include systems configured to perform steps and functions of the described methods, and a non-transitory computer-readable storage medium storing one or more programs, the one or more programs comprising instructions which, when executed by one or more processors of an electronic device, cause the electronic device to perform steps and functions of the described methods.

These and other aspects of the present disclosure are disclosed in the following detailed description of the embodiments, the appended claims, and the accompanying figures.

DETAILED DESCRIPTION

Figure 1:
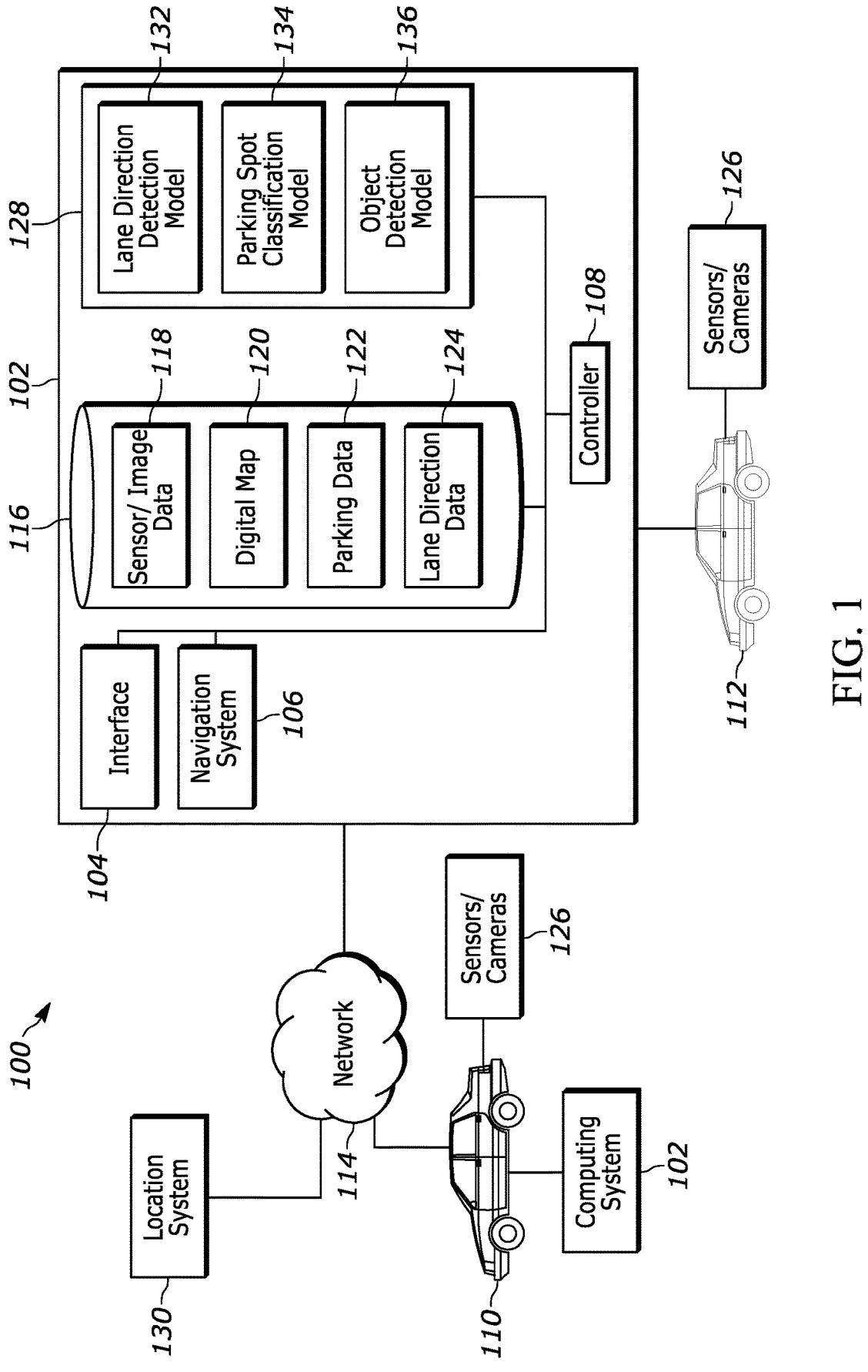
FIG. 1 illustrates a block diagram depicting an example system for assisting navigation within a parking zone according to the principles of the present disclosure.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

"A", "an", and "the" as used herein refers to both singular and plural referents unless the context clearly dictates otherwise. By way of example, "a processor" programmed to perform various functions refers to one processor programmed to perform each and every function, or more than one processor collectively programmed to perform each of the various functions.

Some portions of this description describe the embodiments of the disclosure in terms of algorithms and operations. These operations are understood to be implemented by computer programs or equivalent electrical circuits, machine code, or the like, examples of which are disclosed herein. Furthermore, these arrangements of operations may be referred to as modules or units, without loss of generality. The described operations and their associated modules or units may be embodied in software, firmware, and/or hardware.

Steps, operations, or processes described may be performed or implemented with one or more hardware or software modules, alone or in combination with other devices. Although the steps, operations, or processes are described in sequence, it will be understood that in some embodiments the sequence order may differ from that which has been described, for example with certain steps, operations, or processes being omitted or performed in parallel or concurrently.

References herein to a "parking zone" should be construed to include parking lots, parking garages, streets with parking spots (e.g., parallel or angled parking spots next to a drive lane on a road), and other similar spaces where several parking spots are concentrated or grouped together. A parking zone can include a physical area that is established for parking, storing, or keeping a vehicle for a period of time. The parking zone can include one or more markers, lines, signs, or other indications to facilitate parking or define aspects of the parking zone, such as arrows used to designate a permitted driving direction or direction of travel (referred to herein as a "lane direction") as described herein. For example, the parking zone may or may not include parking lines that define or allocate a physical area or space in which a vehicle is to park. The parking lot can include signs that provide parking restrictions, such as types of vehicles that can park in a parking space or spot (e.g., small vehicle, mid-size vehicle, full size vehicle, sports utility vehicle, truck, hybrid, electric vehicle), requirements (e.g., handicap sticker), or time constraints (e.g., 1 hour parking, 2 hour parking).

It is nearly ubiquitous for modern vehicles to be equipped with a variety of sensors. Whether internal or external to the passenger cabin of the vehicle, these sensors provide the foundation for driving automation and vehicle autonomy. Vehicles with autonomous or semi-autonomous driving or driver-assistant features can use these sensors and associated computer vision technology to provide parking assistance. Parking assist systems can help drivers park their vehicles in parking spaces, either automatically or guiding the driver to do so. However, in order to find an available parking space in a parking zone, a vehicle typically must enter the parking zone whereupon the vehicle's sensors or the driver drives back and forth within the parking zone while visually scanning for unoccupied parking spots.

Typically, to navigate a parking zone, a permitted driving direction, or lane direction (e.g., a permitted driving direction in a lane of the parking zone occupied by the vehicle, a lane intersection the lane occupied by the vehicle, etc.), may be determined in accordance with sensor or other measurement data (e.g., data obtained by an inertial measurement or motion unit, or IMU), wheel odometry, GPS data, pre-mapped data, etc., and vehicles do not have the capability of learning driving direction.

Accordingly, a more robust vision sensor system is required to identify correct and incorrect lane directions for parking zones. Lane direction detection systems and methods (which may be implemented by/within parking systems and methods) according to the principles of the present disclosure are configured to determine lane directions based on ground markings, such as arrows, in a parking zone and assist and/or control navigation based on the determined lane directions indicated by the arrows.

For example, systems and methods of the present disclosure implement vehicle sensors and cameras to detect lane-based ground arrow markings and apply a lane direction detection model or algorithm (e.g., a geometrical point algorithm) to the detected arrow markings to determine arrow direction, arrow direction relative to the vehicle driving direction, etc. For example, the geometrical point algorithm according to the present disclosure determines the lane direction and provides a correct (i.e., permitted or desired) driving direction using only ground arrow marking detection and assists the vehicle driver and/or an autonomous driving system by providing an indication of whether a current and/or intended driving direction is correct or incorrect (e.g., by providing a correct or wrong lane indication on a display or other interface), providing an indicator for a correct direction in which to proceed or turn, etc.

The systems and methods described herein require only camera-based and/or other sensor-based images (e.g., from single or multiple cameras, including, but not limited to narrow, pinhole, fisheye, panoramic, and/or wide-angle lens cameras). The images are provided to a model, such as a machine learning (ML) model, configured to detect arrow markings and directions of the arrow markings and determine a lane direction accordingly.

In this manner, lane direction can be determined while the vehicle is moving and without requiring GPS data, pre-mapping data (e.g., previously obtained lane direction data), or other mapping data.

In one example, a system configured to implement a lane direction detection model according to the present disclosure acquires image data from one or more image capture devices, such as cameras, and processes the image data to obtain a top-down view or image of an environment around the vehicles. For example, an inverse perspective projection (IPP)-based technique may be used to project the image data into a top-down scene or image (i.e., into a top-down domain). The system then analyzes the top-down image to detect and extract arrow markings in the top-down image. Detecting and extracting arrow markings may include providing the top-down image to an image segmentation network or model configured to analyze the top-down image, extract features, segment the top-down image based on the extracted features, including identifying portions of the top-down image corresponding to arrow markings, and generate and output a segmented image. In some examples, only arrow markings are identified in the segmented image (e.g., the segmented image identifies arrow segments within the image).

The system determines a direction of the arrow (and, accordingly, a lane direction) based on the segmented image. For example, the direction of each arrow is determined based on a point density analysis of the arrow. A lane direction output is generated and provided based on the determined lane direction. For example, the lane direction is provided to a vehicle interface or display, to an autonomous driving system, etc. In some examples, a warning or alert (e.g., an audio and/or visual alert) may be provided to indicate that a current driving direction of the vehicle is inconsistent with the lane direction.

Although described herein with respect to predicting lane direction in parking zones, the principles of the present disclosure may be implanted to predict lane direction on non-parking zones, such as roadways.

FIG. 1 illustrates a block diagram depicting an example system 100 for assisting a vehicle to navigate within (and, in some examples, park in) a parking zone. The system 100 may include at least one computing system 102 configured to determine lane direction according to the principles of the present disclosure. In some examples, the computing system 102 is configured to generate map data and update the map data based on sensor data, stored data, etc. The computing system 102 may implement one or more machine learning models to perform various functions described herein.

The computing system may include at least one interface 104, at least one navigation system 106 configured to detect arrow markings and determine lane direction, and at least one controller 108. In some examples, the navigation system 106 is further configured to generate and update a digital map of the parking zone. The computing system 102 can include hardware or a combination of hardware and software, such as communications buses, circuitry, processors, communications interfaces, among others. The computing system 102 can reside on or within a corresponding vehicle (e.g., a host vehicle). For example, FIG. 1 shows a first vehicle 110 with a computing system 102 on-board, and a second vehicle 112 with another or similar computing system 102 on-board. Alternatively (or in addition), all or part of the computing system 102 can reside on a remote server (e.g., the cloud) which is communicatively coupled to the vehicles 110, 112 via a network 114. Each of the first vehicle 110 and the second vehicle 112 (or their corresponding computing system 102) can be communicatively connected to the network 114 to each other (e.g., via vehicle-to-vehicle (V2V) communication), to the cloud (e.g., via vehicle-to-cloud (V2C) communication), and/or to one or more other systems (e.g., a global positioning system (GPS), or to one or more communications devices).

For example, the vehicles may include one or more transceivers configured to establish a secure communication channel with another vehicle or the remote server wirelessly using one or more communication protocols, such as, for example, communication protocol based on vehicle-to-vehicle (V2V) communications, wireless local area network (WLAN) or wireless fidelity (WiFi, e.g., any variant of IEEE 802.11 including 802.11a/b/g/n), wireless personal area network (WPAN, e.g., Bluetooth, Zigbee), cellular (e.g., LTE, 3G/4G/5G, etc.), wireless metropolitan area network WIMAN (e.g., WiMax), and other wide area network, WAN technologies (e.g., iBurst, Flash-OFDM, EV-DO, HSPA, RTT, EDGE, GPRS), dedicated short range communications (DSRC), near field communication (NFC), Internet of Things (IoT) communication protocols (e.g., Thread, Matter, etc.), and the like. This enables the exchange of information and data that is described herein.

The computing system 102 may also include at least one data repository or data storage 116. The data storage 116 can include or store sensor/image data 118 (originating from cameras/sensors described herein), a digital map or digital map data 120 (which may include global map data as described below in more detail), parking data 122, and lane direction data 124. Portions of the data stored in the data storage 116 may be stored in a remote location (e.g., a remote server, a cloud computing system, etc.). In other words, at least a portion of the data storage 116 may be located remotely relative to the first vehicle 110.

The sensor/image data 118 can include information about available sensors/cameras, identifying information for the sensors/cameras, address information, internet protocol information, unique identifiers, data format, protocol used to communicate with the sensors/cameras, or a mapping of information type to sensor/camera type or identifier. The sensor/image data 118 can further include or store information collected by vehicle sensors/cameras 126. The sensor/image data 118 can be stored with corresponding timestamps and date stamps. The sensor/image data 118 can store sensor/image data using location stamps. The sensor/image data 118 can categorize the sensor/image data based on a parking zone or characteristics of a parking zone. As used herein, "sensor/image data" may be used to describe image data, captured by one or more cameras, to be used for arrow marking and lane direction detection/predication as described herein.

The various vehicle sensors/cameras 126 that generate the sensor/image data 118 can include one or more sensing elements or transducers that captures, acquires, records or converts information about its host vehicle or the host vehicle's environment into a form for processing. The sensors/cameras 126 can acquire or detect information about parking zones. The sensors/cameras 126 can detect a parking zone condition such as a road feature, boundary, intersection, lane, lane marker, or other condition. The sensors/cameras 126 can also detect a feature of a particular parking space, such as symbols that represent the parking space is for handicapped, emergency vehicles only, pregnant women (expectant mothers), and the like. The sensors/cameras 126 can, for example, acquire one or more images of the parking zone, which can be processed using image processing and object recognition to identify or detect features indicative of a parking zone, e.g., a parking sign, a stop sign, a handicap parking sign, or surface markings on a parking zone. As examples, the sensors/cameras 126 can be or include an image sensor such as a photographic sensor (e.g., camera), radar sensor, ultrasonic sensor, millimeter wave sensor, infra-red sensor, ultra-violet sensor, light detection sensor, lidar sensor, or the like. The sensors/cameras 126 can communicate sensed data, images or recording to the computing system 102 for processing, which can include filtering, noise reduction, image enhancement, etc., followed by object recognition, feature detection, segmentation processes, and the like. The raw data originating from the sensors/cameras 126 as well as the processed data by the computing system 102 can be referred to as sensor/image data 118 or image data that is sensed by an associated sensors/cameras 126.

The sensors/cameras 126 can also include a global positioning system (GPS) device that can determine a location of the host vehicle relative to an intersection, using map data with an indication of the parking zone. The GPS device can communicate with location system 130, described further below. The computing system 102 can use the GPS device and the map data to determine that the host vehicle (e.g., first vehicle 110) has reached the parking zone. The computing system 102 can use the GPS device and the map data to determine the boundaries of the parking zone. The sensors/cameras 126 can also detect (e.g., using motion sensing, imaging or any of the other sensing capabilities described herein) whether any other vehicle or object is present at or approaching the parking zone, and can track any such vehicle or object's position or movement over time for instance. The sensors/cameras 126 can also detect the relative position between another vehicle and a parking spot, e.g., whether or not a parking spot is occupied by a vehicle as indicated by at least a portion of the vehicle being between the boundaries of two adjacent parking spot lines.

In some examples, using any one or more of the aforementioned types of sensors/cameras 126, the vehicle (e.g., first vehicle 110) is configured to virtually map the parking zone. For example, the sensors/cameras 126 obtain data used to calculate relative distances between detected objects and the sensors/cameras 126, and the computing system 102 can utilize a visual simultaneous localization and mapping (SLAM) system. Visual SLAM is a position detecting scheme in which a process of generating a digital map of an environment (such as the parking zone) and a process of acquiring a location of the sensor or vehicle itself are complementarily performed. In other words, characteristics of the environment about the vehicle as well as the location of the vehicle itself are determined simultaneously.

The navigation system 106 is configured to detect ground arrow markings (i.e., arrow markings on ground surfaces of the parking zone) based on the data sensed by the one or more sensors/cameras 126 and detect/predict lane direction (e.g., stored as the lane direction data 124) based on the detected ground arrow markings. The navigation system 106 generate the lane direction data 124 from, with or using one or more machine learning models or neural networks established, maintained, tuned, or otherwise provided via one or more machine learning models 128. The machine learning models 128 can be configured, stored, or established on the computing system 102 of the first vehicle 110, on a remote server, etc. The navigation system 106 can detect, from a first neural network and based on the data sensed by the one or more sensors/cameras 126, arrow markings on surfaces within the parking zone. The navigation system 106 is configured to perform, using the first neural network and based on the data (e.g., image data) sensed by the one or more sensors/cameras 126, scene segmentation of the image data. The navigation system 106 is configured to detect, from a first neural network (e.g., a first neural network implemented by the network 114, the navigation system 106, the controller 108, and/or other components of the computing device 102) and based on the data sensed by the one or more sensors/cameras 126, the lane direction based on the scene segmentation of the image data (e.g., based on arrow markings in the segmented image data). For example, the navigation system 106 determines a direction of the arrow based on a point density analysis of the arrow and predicts the lane direction based on the determined direction of the arrow. In this manner, the navigation system 106 is configured to construct the lane direction data 124 based on the detected arrow markings located in the parking zone.

Various types of machine learning models 128 are disclosed herein. The machine learning model utilized by the navigation system 106 to generate the digital map 120 can include any type of neural network, including, for example, a convolution neural network, deep convolution network, a feed forward neural network, a deep feed forward neural network, a radial basis function neural network, a Kohonen self-organizing neural network, a recurrent neural network, a modular neural network, a long/short term memory neural network, or the like. Each machine learning model 128 can maintain, manage, store, update, tune, or configure one or more neural networks and can use different parameters, weights, training sets, or configurations for each of the neural networks to allow the neural networks to efficiently and accurately process a type of input and generate a type of output. The machine learning models 128 of the present disclosure may include at least one machine learning model configured to perform a point density analysis to determine a direction indicated by a detected arrow marking.

One or more of the disclosed machine learning models 128 disclosed herein can be configured as or include a convolution neural network, such as a segmentation neural network. The convolution neural network (CNN) can include one or more convolution cells (or pooling layers) and kernels that may each perform a different functions. The convolution kernel can process input data, and the pooling layers can simplify the data, using, for example, non-linear functions such as a max, thereby reducing unnecessary features. The CNN can facilitate image recognition. For example, the sensed input data can be passed to convolution layers that form a funnel, compressing detected features. The first layer can detect first characteristics, the second layer can detect second characteristics, and so on.

The convolution neural network can be a type of deep, feed-forward artificial neural network configured to analyze visual imagery. The convolution neural network can include multilayer perceptrons designed to use minimal preprocessing. The convolution neural network can include or be referred to as shift invariant or space invariant artificial neural networks, based on their shared-weights architecture and translation invariance characteristics. Since convolution neural networks can use relatively less pre-processing compared to other image classification algorithms, the convolution neural network can automatically learn the filters that may be hand-engineered for other image classification algorithms, thereby improving the efficiency associated with configuring, establishing or setting up the neural network, thereby providing a technical advantage relative to other image classification techniques.

One or more of the disclosed machine learning models 128 disclosed herein can include a CNN having an input layer and an output layer, and one or more hidden layers that can include convolution layers, pooling layers, fully connected layers, or normalization layers. The one or more pooling layers can include local pooling layers or global pooling layers. The pooling layers can combine the outputs of neuron clusters at one layer into a single neuron in the next layer. For example, max pooling can use the maximum value from each of a cluster of neurons at the prior layer. Another example is average pooling, which can use the average value from each of a cluster of neurons at the prior layer. The fully connected layers can connect every neuron in one layer to every neuron in another layer.

In some examples, the navigation system 106 is further configured to implement visual SLAM (or similar technologies) to generate the digital map 120 of the parking zone. The navigation system 106 is configured to generate digital map data based on the data sensed by the one or more sensors/cameras 126. The digital map data structure (which may be referred to as digital map 120) can generate the digital map from, with or using one or more machine learning models or neural networks established, maintained, tuned, or otherwise provided via one or more machine learning models 128 as described above. The navigation system 106 can detect, from the first neural network and/or a second neural network and based on the data sensed by the one or more sensors/cameras 126, objects located in the parking lot. The navigation system 106 can perform, using the first neural network and based on the data sensed by the one or more sensors/cameras 126, scene segmentation. The navigation system 106 can determine, using the first neural network and based on the data sensed by the one or more sensors/cameras 126, depth information for the parking zone. The navigation system 106 can identify, from the first neural network and based on the data sensed by the one or more sensors/cameras 126, one or more parking lines or parking spots in the parking zone. The navigation system 106 can construct the digital map based on the detected objects located at the parking zone, the scene segmentation, the depth information for the parking zone, and the one or more parking lines at the parking zone.

The navigation system 106 can create the digital map 120 based on the sensor/image data 118. This digital map 120 can be created via implemented visual SLAM, as described above. In one embodiment, the digital map 120 can include three dimensions on an x-y-z coordinate plate, and associated dimensions can include latitude, longitude, and range, for example. The digital map 120 can be updated periodically or reflect or indicate a motion, movement or change in one or more objects detected in the parking zone. For example, the digital map can include stationary objects associated with the scene, such as a curb, tree, lines, parking signs, or boundary of the parking zone, as well as non-stationary objects such as vehicles moving or a person moving (e.g., walking, biking, or running).

To generate the lane direction data 124 (and/or the digital map 120 and other data stored in the data storage 116), the computing system 102 may interface or communicate with a location system 130 via the interface 104 and the network 114. The location system 130 can determine and communicate the location of one or more of the vehicles 110, 112 during the performance of the SLAM or similar mapping techniques executed in generating the digital map 120. The location system 130 can include any device based on a positioning system such as Global Navigation Satellite System (GNSS), which can include GPS, GLONASS, Galileo, Beidou and/or other regional systems. The location system 130 can include one or more cellular towers to provide triangulation. The location system 130 can include wireless beacons, such as near field communication beacons, short-range wireless beacons (e.g., Bluetooth beacons), or Wi-Fi modules.

The computing system 102 may be configured to use the interface 104 to receive and transmit information. The interface 104 can receive and transmit information using one or more protocols, such as a network protocol. The interface 104 can include a hardware interface, software interface, wired interface, or wireless interface. The interface 104 can facilitate translating or formatting data from one format to another format. For example, the interface 104 can include an application programming interface that includes definitions for communicating between various components, such as software components. The interface 104 can be designed, constructed or operational to communicate with one or more sensors/cameras 126 to collect or receive information, e.g., image data. The interface 104 can be designed, constructed or operational to communicate with the controller 108 to provide commands or instructions to control a vehicle, such as the first vehicle 110. The information collected from the one or more sensors can be stored as shown by sensor/image data 118.

The interface 104 can receive the image data sensed by the one or more sensors/cameras 126 regarding an environment or characteristics of a parking zone. The sensed data received from the sensors/cameras 126 can include data detected, obtained, sensed, collected, or otherwise identified by the sensors/cameras 126. As explained above, the sensors/cameras 126 can be one or more various types of sensors, and therefore the data received by the interface 104 for processing can be data from a camera, data from an infrared camera, lidar data, laser-based sensor data, radar data, transducer data, or ultrasonic sensor data. Because this data can, when processed, enable information about the parking zone to be visualized, this data can be referred to as image data.

The data sensed from the sensors/cameras 126 can be received by interface 104 and delivered to navigation system 106 for detecting various qualities or characteristics of the parking zone (e.g., arrow markings, parking lines, parking space types, etc.) as described above using techniques such as segmentation, CNNs, and/or other machine learning models. For example, the navigation system 106 can rely on one or more neural networks or machine learning models 128 to detect objects, scene segmentation, roads, terrain, trees, curbs, obstacles, depth or range of the parking lot, parking line detection, parking marker detection, parking signs, or other objects at or associated with the parking zone. The computing system 102 can train the machine learning models 128 using historical data. Training may be performed using the computing system 102 and/or a computing system located remotely from the vehicles 110/112. In other words, all or portions of the computing system 102 may be located on a remote server. Once trained, the models can be communicated to or loaded onto the vehicles 110, 112 via network 114 for execution.

In some examples, once generated, data such as the lane marking data 124, the digital map 120, etc. can be stored in the data storage 116 and accessed by other vehicles. For example, the computing system 102 of the first vehicle 110 may be used to generate the lane marking data 124, the digital map 120, etc., which may subsequently be accessed by the computing system 102 of the second vehicle 112. The computing system 102 of the second vehicle 112 (and other vehicles) may update the digital map 120 in real-time based upon more reliable data captured by the second vehicle 112. In addition, the computing system 102 of both of the vehicles 110, 112 may be used to generate and continuously update the stored data in real-time.

As described above, one or more machine learning models 128 can be relied upon to perform the various functions described herein. The machine learning models 128 may include, but are not limited to, a lane direction detection or prediction model 132, a parking spot classification model 134, an object detection model 136, and/or other models. The lane direction detection model 132 is trained and configured to process image data to detect and identify arrow markings, determine orientation/directions of the arrow markings, and predict lane direction based on the directions of the arrow markings as described below in more detail.

The parking spot classification model 134 is trained and configured to, based on the above data, perform image classification (e.g., segmentation) to generate and update parking data relating to the parking spaces of the parking zone. For example, the parking spot classification model 134 can be a machine learning model that determines whether each parking spot is a normal parking spot, a handicapped parking spot, a charging station for an electric vehicle (and, for example, whether that charging station is for wireless charging or charging by cable), whether each parking spot has an allowed duration of parking (e.g., 1 hour, 2 hours, etc.), etc. The output of the parking spot classification model 134 can be used to selectively update the digital map 120 and parking data 122.

The object detection model 136 is trained and configured to, based on the above data, detect objects or obstacles in the parking zone. This can include parking lines used to determine whether a parking spot is present. The object detection model 136 can, for example, determine the presence of a vehicle in a parking spot, thus enabling a determination that a parking spot is occupied. The object detection model 136 can also determine the presence of a pothole, cone, debris, or other objects in the parking zone, which can be stored in the data storage 116 and communicated to other vehicles (e.g., vehicle 112) that subsequently enter the parking zone.

Figure 2A:
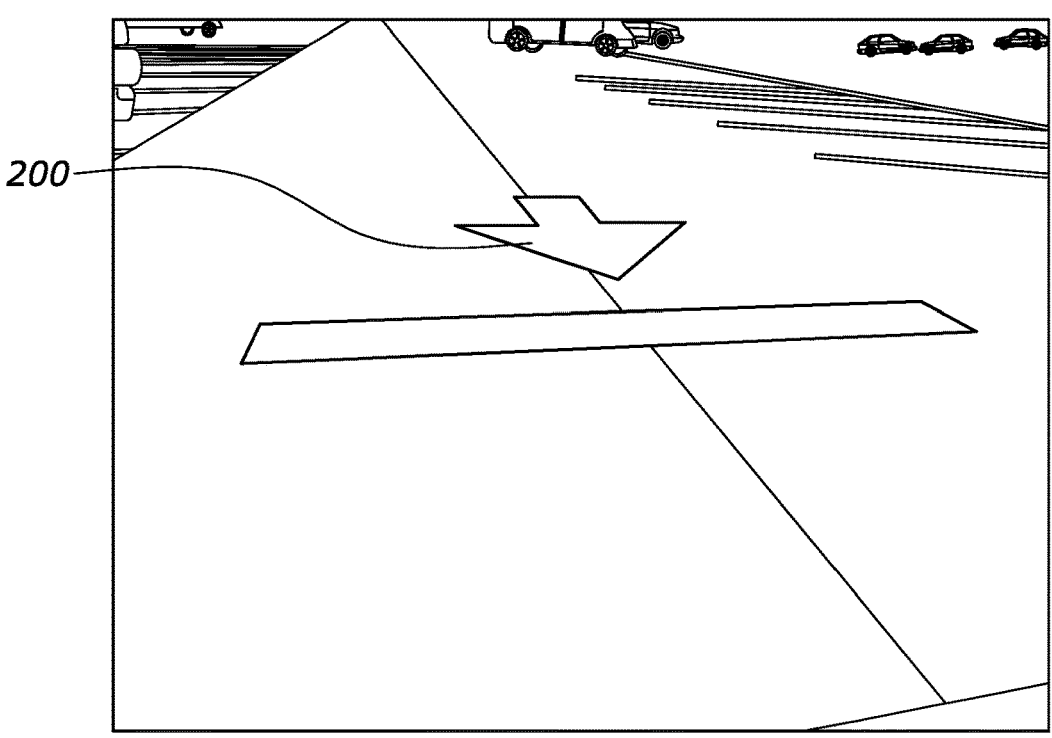
FIGS. 2A, 2B, 2C, and 2D illustrate example arrow markings on ground surfaces in a parking zone or non-parking zone.
Figure 2B:
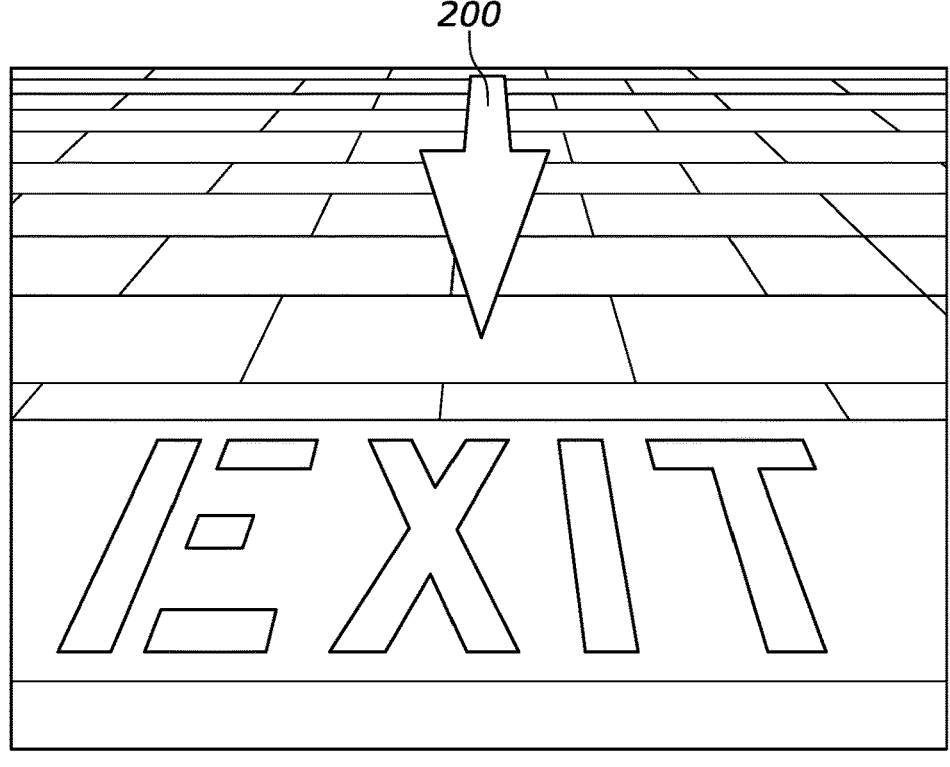
Figures 2C, 2D:
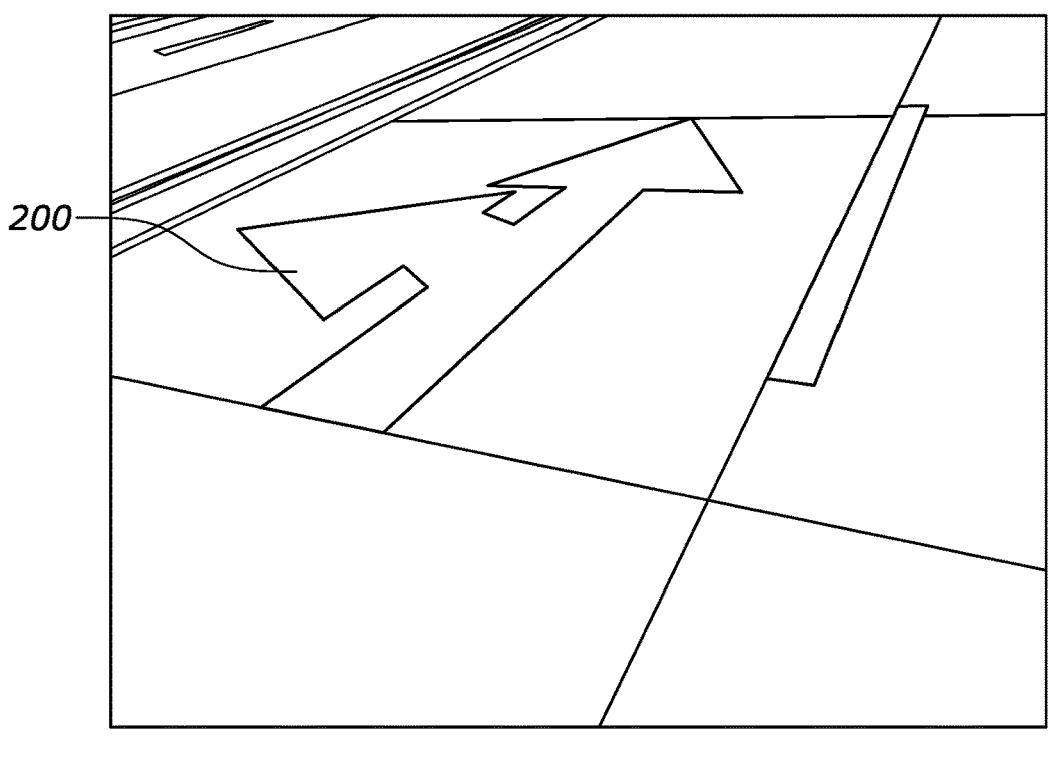

FIGS. 2A, 2B, 2C, and 2D illustrate example arrow markings on ground surfaces. Parking (and non-parking) zones may use various directional arrows 200 to indicate lane direction, permitted or desired driving direction, etc. The arrows 200 may have different shapes (e.g., single arrows as shown in FIGS. 2A and 2B, fused or multidirectional arrows as shown in FIGS. 2C and 2D, etc.) and/or colors (e.g., yellow, white, etc.). In some examples, arrow markings may be include or be arranged near other markings, such as lane markings, text, etc.

Typically, a correct or permitted driving direction is determined using data obtained by IMU data, wheel odometry data, GPS data, pre-mapping data, etc., which are not obtained based on ground arrow markings. For example, IMU and wheel odometry data are obtained using low resolution sensors and therefore such data does not accurately indicate arrow markings and arrow direction, especially in view of the large variety of types of arrow markings, modification of arrow markings (e.g., change in direction of arrow markings due to redesign of the parking zone), etc.

Figure 3:
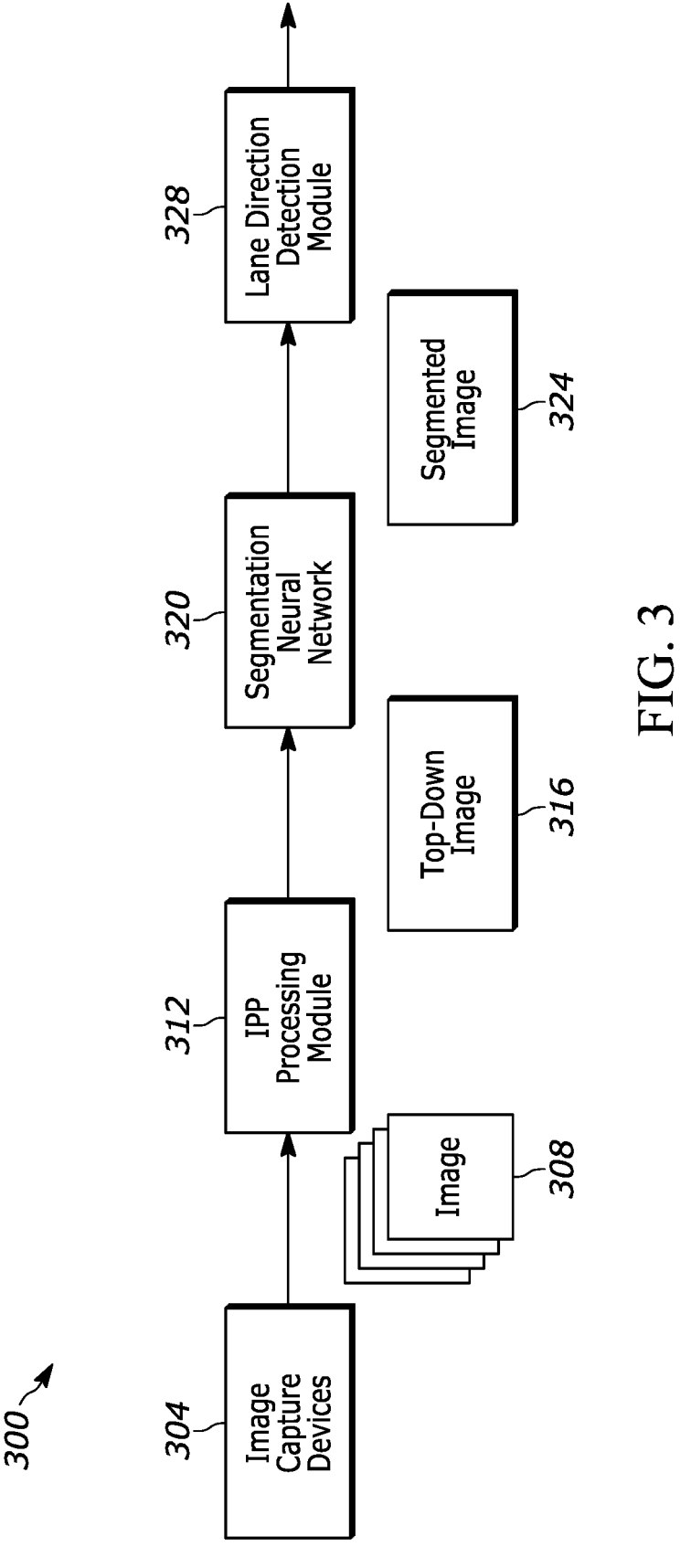
FIG. 3 shows an example lane direction detection system according to the principles of the present disclosure.

FIG. 3 shows an example lane direction detection system 300 according to the principles of the present disclosure. The system 300 is configured to, while the vehicle is moving, implement one or more cameras configured to capture high resolution image data (relative to low resolution sensor data obtained by IMU sensors, wheel odometry sensors, etc.), detect arrow markings using the captured image data, determine lane directions based on the arrow markings, and assist and/or control navigation based on the determined lane directions. The system 300 is further configured to identify and generate a notification of whether the vehicle is driving in a correct or incorrect direction relative to the lane direction. The system 300 is configured to detect and be responsive to different types of arrow markings (i.e., different shapes, colors, arrangements, etc.), and may be implemented with one or more types of cameras, including, but not limited to, narrow, pinhole, fisheye, panoramic, and/or wide-angle lens cameras. Since the lane direction detection is performed in real-time or near real-time using image data captured while the vehicle is navigating the parking zone, the system 300 is responsive to any modifications made to arrow markings within the parking zone and is not limited to previously obtained data indicating lane directions within the parking zone.

In an example, the system 300 executes the lane direction detection model 132 (or other model) to execute an algorithm (e.g., a geometrical point algorithm) to perform a point density analysis of the detected arrow markings, determine arrow direction based on the point density analysis, and detect lane direction in accordance with the determined arrow direction.

One or more image capture devices (e.g., cameras) 304 captures/acquires one or more images 308 of an environment around a vehicle. In an example, the vehicle includes four of the image capture devices 304, each arranged to capture one of four respective images of (e.g. images in front of, behind, and on either (left and right) side of) the environment around the vehicle. In other examples, fewer or more than four of the image capture devices 304 may be used. The image capture devices 304 may include cameras such as narrow, pinhole, fisheye, panoramic, wide-angle lens, and/or other types of cameras.

The captured images 308 are processed (e.g., at an inverse perspective projection (IPP) processing module or circuitry 312) to generate a top-down image 316. The IPP processing module 312 is configured to project the images 308 from an image domain into a top-down view domain. Although described herein as implementing IPP techniques, other techniques for generating the top-down image 316 may be used, such as various multi-view geometry techniques. In some examples, the images 308 may be provided as inputs to a CNN or other machine learning model, a deep learning network, etc. configured to generate the top-down image 316 using the images 308.

The top-down image 316 is provided as an input to a model or neural network, such as a segmentation neural network 320 or other type of classification model, configured to detect and extract arrow markings in the top-down image 316. For example, the segmentation neural network 320 is configured to extract features from the top-down image 316, segment the top-down image 316 based on the extracted features, including identifying portions of the top-down image 316 corresponding to arrow markings, and generate and output a segmented image 324. For example, the segmentation neural network 320 is configured to perform semantic, instance, and/or other types of segmentation to identify portions and locations of the top-down image that include arrow markings.

Although described herein as using IPP processing, in other examples the principles of the present disclosure may be implemented without IPP processing. For example, the captured images 308 may be provided directly to an image processing or other model configured to extract and label features in the captured images 308, the segmentation neural network 320 may be configured to receive the captured images 308 as inputs, etc.

The segmented image 324 is provided as in input to a lane direction detection module or circuitry 328 configured to determine a direction of (i.e., indicated by) arrow marking or markings in the segmented image 324 and detect a lane direction based on the determined direction of the arrow marking. In an example, the lane direction detection module 328 is configured to perform a point density analysis or other spatial analysis technique that measures a concentration of points within one or more areas of the segmented image corresponding to arrow markings in the segmented image 324. The lane direction detection module 328 then determines the direction of the arrow markings based on results of the point density analysis. An output of the lane direction detection module 328 is a detected lane direction, which may be provided as an input to a vehicle interface or display, to an autonomous driving system, etc. In some examples, a warning or alert (e.g., an audio and/or visual alert) may be provided to indicate that a current driving direction of the vehicle is inconsistent with the lane direction.

Figure 4:
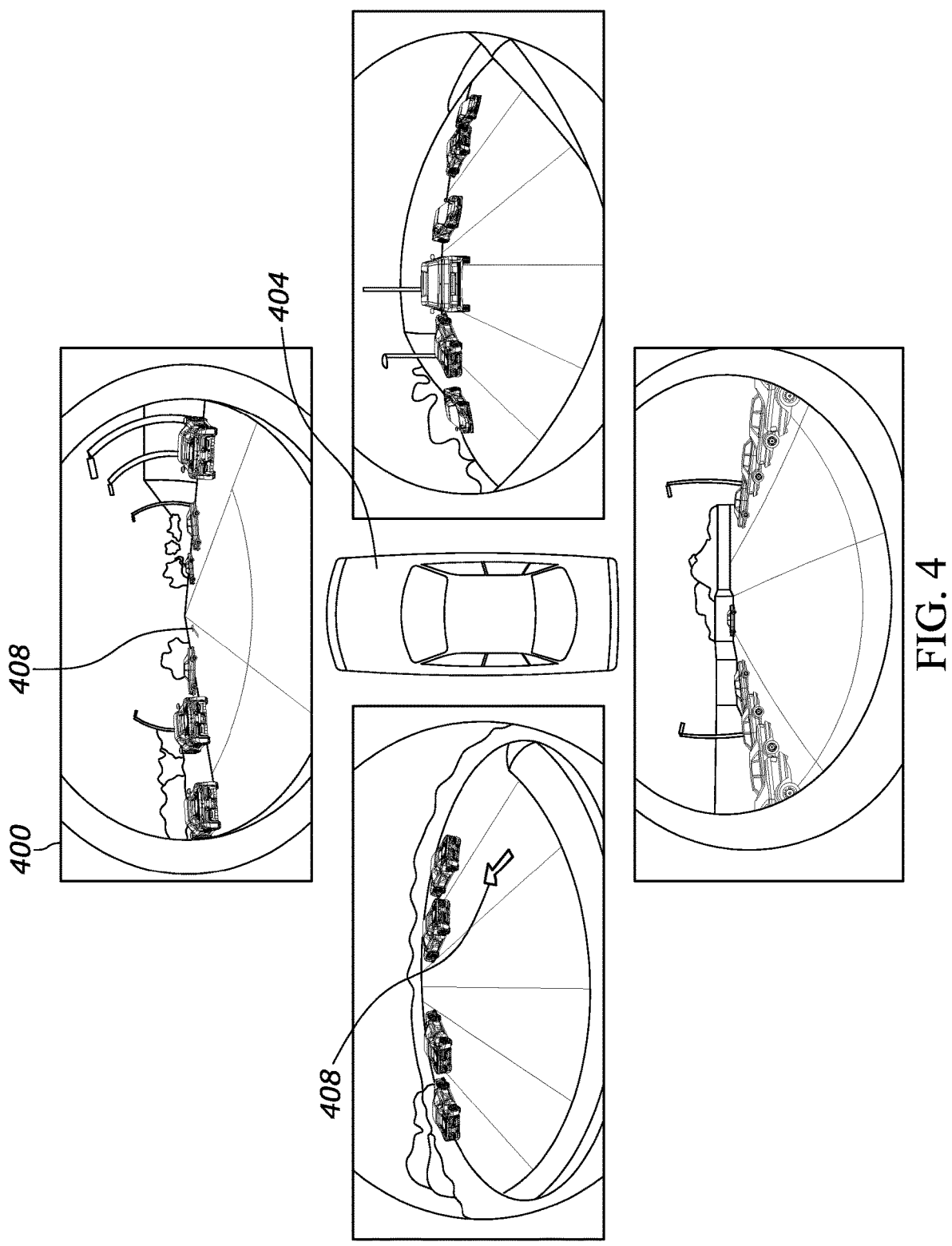
FIGS. 4, 5, 6, and 7 generally illustrate example image analysis and processing performed by the lane direction detection system according to the principles of the present disclosure.

FIGS. 4, 5, 6, and 7 generally illustrate example image analysis and processing performed by the lane direction detection system 300 according to the principles of the present disclosure. FIG. 4 shows a plurality of images 400 captured by cameras or other image capture devices arranged in or on a vehicle 404. In this example, the vehicle 404 includes four of the image captures devices arranged to capture images in front of, behind, and on either side of the environment around the vehicle 404. As shown, the images 400 correspond to images captured by a fisheye lens camera. Images corresponding to a front-view and a left-side-view of the vehicle 404 include an arrow marking as shown at 408.

Figure 5:
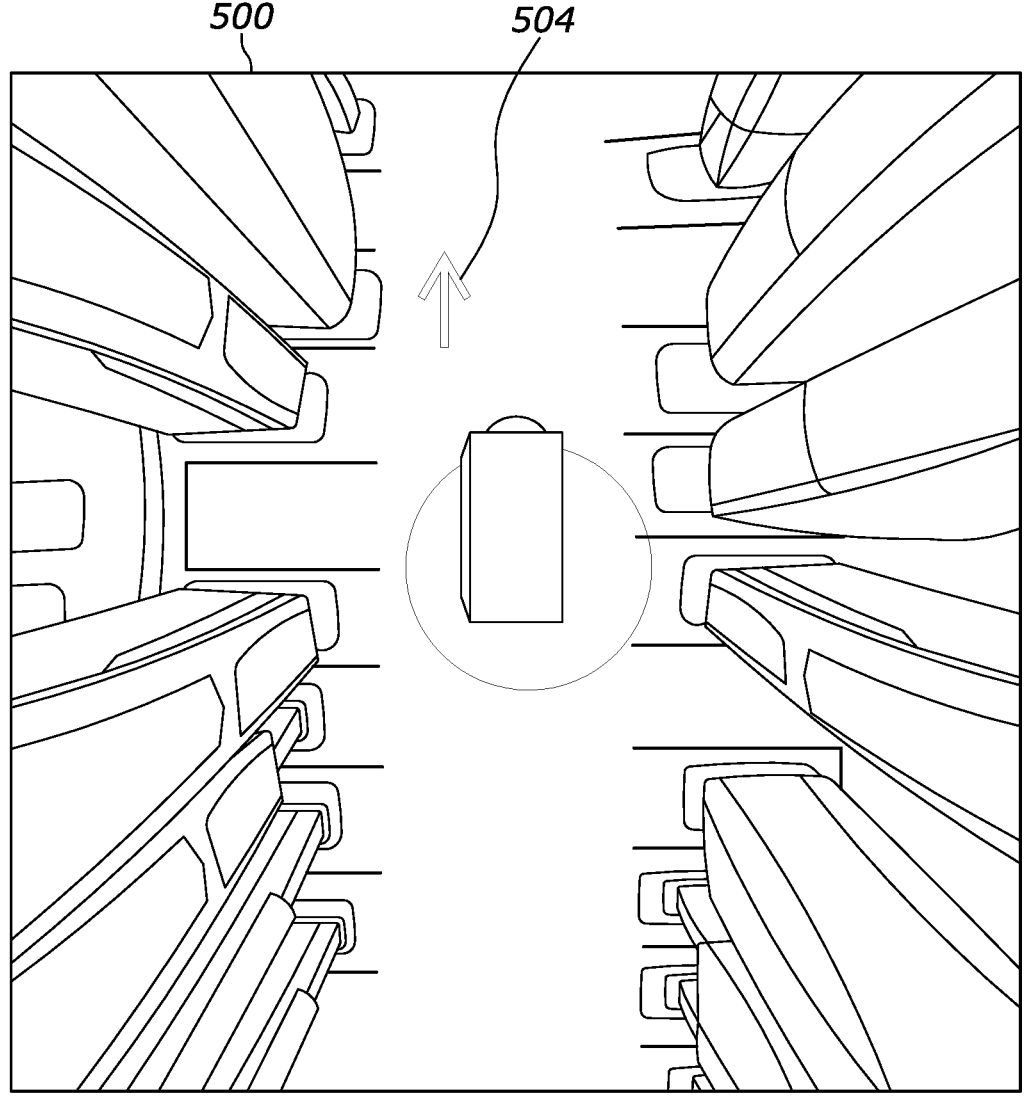

FIG. 5 illustrates a top-down image 500 generated using the images 400 of FIG. 4. For example, the images 400 are processed using the IPP processing module 312) described above in FIG. 3 to generate the top-down image 500. The top-down image 500 includes the vehicle 404 and any arrow markings contained in the images 400. In this example, the top-down image 500 includes an arrow marking 504, which corresponds to the arrow marking 408 contained in multiple images 400 (and shown in multiple perspectives) subsequent to IPP processing. In other words, the arrow marking 504 as shown in FIG. 5 is a result of systems and methods of the present disclosure processing and analyzing the images 400 to provide a top-down view of the environment around the vehicle 404 that accurately indicates locations and characteristics of arrow markings relative to the vehicle 404. Further, the top-down image 500 corrects any warping or distortion of the arrow marking 408/504 resulting from capturing the images 400 at various perspectives.

Figure 6:
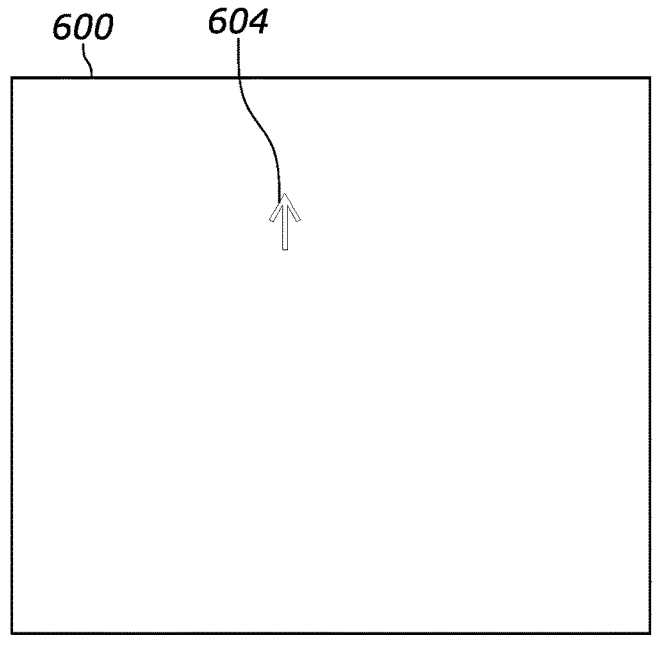

FIG. 6 shows an example segmented image 600 generated based on the top-down image 500. For example, the top-down image 500 is provided to the segmentation neural network 320, which is configured to extract and identify features in the top-down image 500 to identify an arrow marking 604. For example, the segmentation neural network 320 is configured to identify a region or area of the top-down image 500 containing the arrow marking 604, identify pixels in the top-down image 500 corresponding to the arrow marking 604, etc. As shown, the segmented image 600 includes only the arrow marking 604 (i.e., excludes identified/segmented features that do not correspond to arrow markings, such as the vehicle 404, other vehicles, etc.). In other examples, the segmented image 600 may include other features.

Figure 7:
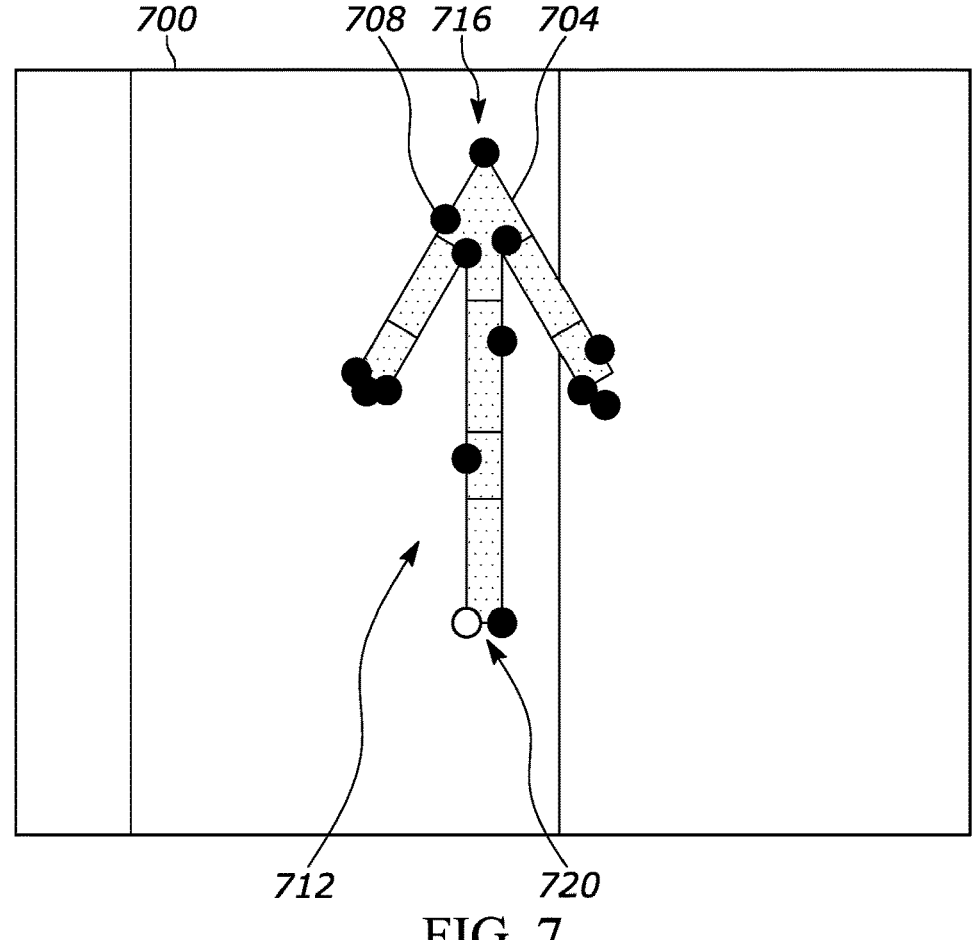

FIG. 7 shows example results of point density analysis performed on the segmented image 600. For example, the lane direction detection module 328 performs the point density analysis or other spatial analysis technique to generate a modified segmented image 700 including an arrow marking 704 and an overlay of points 708. The points 708 may be provided at locations corresponding to detected boundaries between the arrow marking 704 and a surrounding region 712. The lane direction detection module 328 is further configured to measure concentrations of the points 708 within the modified segmented image 700. In an example, a portion of the image 700 having a greater concentration of the points 708 corresponds to an arrow direction of the arrow marking 704. For example, a first end 716 of the arrow marking 704 corresponding to the arrow direction typically includes a greater number of angles and other features resulting in detectable points and therefore results in a greater concentration of the points 708 (i.e., relative to a second end 720 of the arrow marking 704). In this manner, the lane direction detection module 328 is configured to determine the direction of the arrow marking 704 (i.e., the arrow direction) based on the measured concentration of points 708 in the results of the point density analysis, and to detect the lane direction based on the arrow direction.

Figure 8:
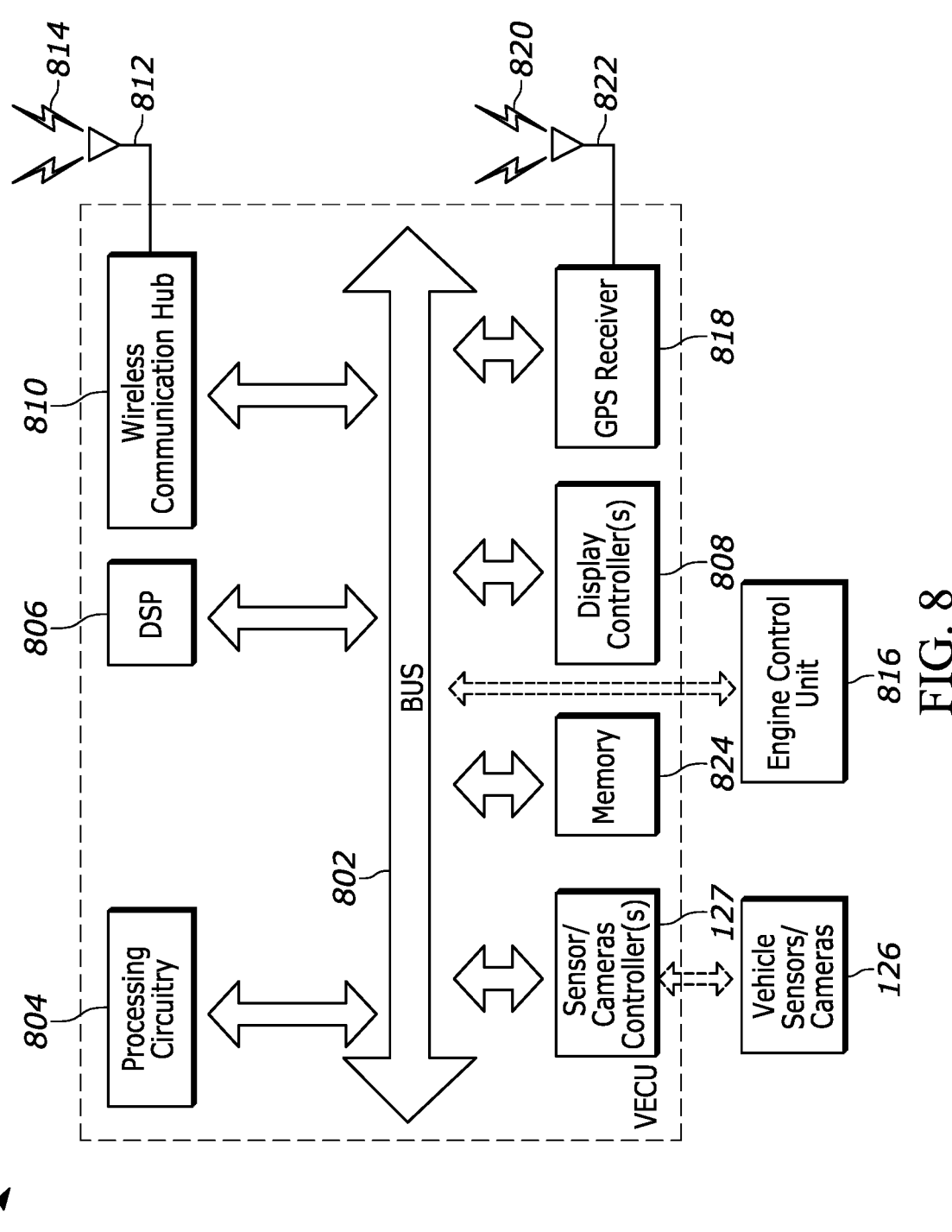
FIG. 8 illustrates a block diagram of a vehicle electronics control system the principles of the present disclosure.

FIG. 8 is a block diagram of internal components of an example computing system 800 configured to perform lane direction detection according to the systems and methods of the present disclosure. The computing system 800 may include or be used to implement the computing systems and methods described above. In this embodiment, the computing system 800 may be embodied at least in part in a vehicle electronics control unit (VECU). It should be noted that FIG. 8 is meant only to provide a generalized illustration of various components, any or all of which may be utilized as appropriate. It can be noted that, in some instances, components illustrated by FIG. 8 can be localized to a single physical device and/or distributed among various networked devices, which may be disposed at different physical locations.

The computing system 800 has hardware elements that can be electrically coupled via a BUS 802. The hardware elements may include processing circuitry 804 which can include, without limitation, one or more processors, one or more special-purpose processors (such as digital signal processing (DSP) chips, graphics acceleration processors, application specific integrated circuits (ASICs), and/or the like), and/or other processing structure or means. The above-described processors can be specially-programmed to perform the operations disclosed herein, including, among others, image processing, data processing, and implementation of the machine learning models described above. Some embodiments may have a separate DSP 806, depending on desired functionality. The computing system 800 can also include one or more display controllers 808, which can control the display devices disclosed above, such as an in-vehicle touch screen, screen of a mobile device, and/or the like.

The computing system 800 may also include a wireless communication hub 810, or connectivity hub, which can include a modem, a network card, an infrared communication device, a wireless communication device, and/or a chipset (such as a Bluetooth device, an IEEE 802.11 device, an IEEE 802.16.4 device, a WiFi device, a WiMax device, cellular communication facilities including 4G, 5G, etc.), and/or the like. The wireless communication hub 810 can permit data to be exchanged with network 114, wireless access points, other computing systems, etc. The communication can be carried out via one or more wireless communication antenna 812 that send and/or receive wireless signals 814.

The computing system 800 can also include or be configured to communicate with an engine control unit 816, or other type of controller 108 described herein. In the case of a vehicle that does not include an internal combustion engine, the engine control unit may instead be a battery control unit or electric drive control unit configured to command propulsion of the vehicle. In response to instructions received via the wireless communications hub 810, the engine control unit 816 can be operated in order to control the movement of the vehicle during, for example, a parking procedure.

The computing system 800 also includes vehicle sensors/cameras 126 such as those described above with reference to FIG. 1. These sensors can include, without limitation, one or more accelerometer(s), gyroscope(s), camera(s), radar(s), LiDAR(s), odometric sensor(s), and ultrasonic sensor(s), as well as magnetometer(s), altimeter(s), microphone(s), proximity sensor(s), light sensor(s), and the like. These sensors can be controlled via associated sensor/camera controller(s) 127.

The computing system 800 may also include a GPS receiver 818 capable of receiving signals 820 from one or more GPS satellites using a GPS antenna 822. The GPS receiver 818 can extract a position of the device, using conventional techniques, from satellites of an GPS system, such as a global navigation satellite system (GNSS) (e.g., Global Positioning System (GPS)), Galileo, GLONASS, Compass, Galileo, Beidou and/or other regional systems and/or the like.

The computing system 800 can also include or be in communication with a memory 824. The memory 824 can include, without limitation, local and/or network accessible storage, a disk drive, a drive array, an optical storage device, a solid-state storage device, such as a RAM which can be programmable, flash-updateable and/or the like. Such storage devices may be configured to implement any appropriate data stores, including without limitation, various file systems, database structures, and/or the like. The memory 824 can also include software elements (not shown), including an operating system, device drivers, executable libraries, and/or other code embedded in a computer-readable medium, such as one or more application programs, which may comprise computer programs provided by various embodiments, and/or may be designed to implement methods, and/or configure systems, provided by other embodiments, as described herein. In an aspect, then, such code and/or instructions can be used to configure and/or adapt a general purpose computer (or other device) to perform one or more operations in accordance with the described methods, thereby resulting in a special-purpose computer.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. These memory devices may be non-transitory computer-readable storage mediums for storing computer-executable instructions which, when executed by one or more processors described herein, can cause the one or more processors to perform the techniques described herein. The processor and the memory can be supplemented by, or incorporated in, special purpose logic circuitry.

Figure 9:
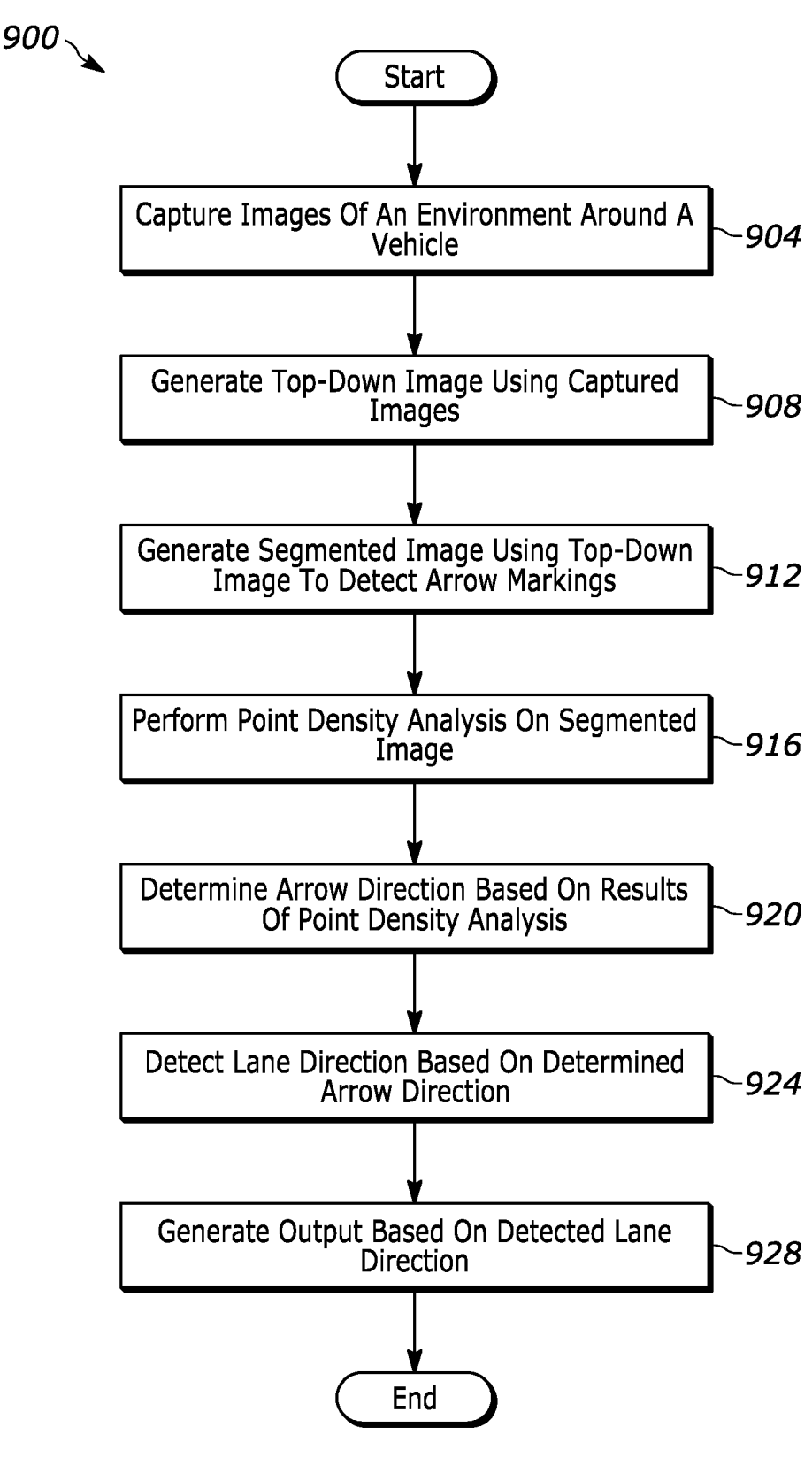
FIG. 9 illustrates a flow diagram of an example method for performing lane direction detection according to the principles of the present disclosure.

FIG. 9 illustrates a method 900 for performing lane direction detection according to the principles of the present disclosure. The method can be performed or executed by one or more systems, components, or functions depicted in FIGS. 1, 3, and 8, including, for example, one or more computing systems 102. In some alternative implementations, the functions noted in the flow chart blocks can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flow chart illustration, and combinations of blocks in the block diagrams and/or flow chart illustration, can be implemented by special purpose hardware-based systems that perform the specified functions or acts or carry out combinations of special purpose hardware and computer instructions.

At 904, one or more images are captured by respective image capture devices of a vehicle. The captured images correspond to images of an environment around a vehicle and may include markings, such as arrow markings, arranged on ground surfaces in the environment around the vehicle. At 908, a top-down image is generated based on the captured images. At 912, a segmented image is generated using the top-down image to detect arrow markings in the top-down image.

At 916, point density analysis or another spatial analysis technique is performed on the segmented image. At 920, at least one arrow direction of an arrow marking in the segmented image is determined based on results of the point density analysis. For example, concentrations of points identified in the results of the point density analysis are measured and the arrow direction is determined based on the measured concentrations.

At 924, lane direction is detected based on the determined arrow direction. Although examples herein are described with respect to a lane that the vehicle is currently driving in, other example systems and methods of the present disclosure may determine arrow directions for lanes the vehicle is not currently driving in (e.g., intersecting lanes), a lane with an opposite driving direction (e.g., in an aisle of a parking zone having two lanes), etc. Further, although described herein with respect to a single arrow marking, in other examples multiple arrow markings and corresponding arrow directions may be detected/determined. In these examples, systems and methods of the present disclosure may detect and generate notifications regarding multiple lane directions for different lanes, indicate permitted or not permitted turning directions at intersections, etc.

As described herein, in response to captured images, a top-down image, and/or the segmented image including two or more arrow markings, the systems and methods of the present disclosure may eliminate, remove, ignore, etc. one or more arrow markings determined to not be relevant to a current driving direction of the vehicle. For example, only an arrow marking nearest to the vehicle may be considered in the calculation of arrow direction and/or lane direction.

Accordingly, at 924, detecting the lane direction may further include determining the lane direction based on multiple arrow marking and arrow directions by selecting one or more arrow markings as relevant arrow markings, disregarding one or more arrow markings, and detecting the lane direction based on the relevant arrow markings.

At 928, one or more actions are performed based on the detected lane direction, including, but not limited to, generating at least one output indicating the lane direction. For example, the detected lane direction is provided to a vehicle interface or display, to an autonomous driving system, etc. In some examples, a warning or alert (e.g., an audio and/or visual alert) may be provided to indicate that a current driving direction of the vehicle is inconsistent with the lane direction. For example, the system 100 is configured to compare the detected lane direction to a current vehicle direction and selectively generate and output a warning in response to a determination that the detected lane direction does not match the current vehicle direction.

Although described in FIG. 9 and elsewhere herein with respect to real-time or near real-time lane direction detection, the principles of the present disclosure may be used to update stored map data, such as the digital map 120, with arrow marking and lane direction data. In other words, the arrow marking and lane direction data may be included in the digital map data and used by one or more other vehicles for parking zone navigation and parking assistance. In one example, route planning through the parking zone may be performed based in part on previously detected arrow markings and corresponding lane direction data. For example, detected arrow markings and/or a corresponding route or path may be highlighted on a map display (e.g., in real-time or near real-time or for subsequent drivers navigating the parking zone) to guide the driver in the correct lane direction. In another example, previously detected arrow markings may be used as checkpoints for route/path planning and navigation.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

What is claimed is:

1. A method performed by a computing device configured to detect a lane direction in a parking zone being navigated by a vehicle, the method comprising:
   capturing, using an image capture device, at least one image of an environment surrounding the vehicle, wherein the at least one image includes an arrow marking on a ground surface of the parking zone;
   generating a top-down image of the environment surrounding the vehicle based on the captured at least one image, wherein the top-down image includes the arrow marking;
   performing an image analysis of the top-down image to determine an arrow direction of the arrow marking;
   detecting, based on results of the image analysis, the lane direction of a lane occupied by the vehicle based on the determined arrow direction;
   generating and providing an output indicating the lane direction of the lane occupied by the vehicle; and
   providing, to an autonomous driving system of the vehicle, an instruction to correct a driving direction of the vehicle and for the vehicle to move in that direction, which includes at least one of, responsive to the detected lane direction:
      providing, to at least one of a driver of the vehicle and the autonomous driving system of the vehicle, a notification of the detected lane direction; and
      providing, to at least one of the driver of the vehicle and the autonomous driving system of the vehicle, a notification that a driving direction of the vehicle is incorrect.

2. The method of claim 1, wherein the generating of the top-down image includes performing inverse perspective projection (IPP) processing on the captured at least one image to generate the top-down image.

3. The method of claim 2, wherein the captured at least one image includes a plurality of captured images, and the performing of the IPP processing includes generating the top-down image using the plurality of captured images.

4. The method of claim 3, wherein the plurality of captured images includes at least four of the captured images corresponding to a front view, a rear view, and left and right views of the environment surrounding the vehicle.

5. The method of claim 1, wherein the performing of the image analysis of the top-down image includes performing segmentation of the top-down image to generate a segmented image that identifies the arrow marking.

6. The method of claim 5, wherein the performing of the image analysis further includes performing a point density analysis of the arrow marking.

7. The method of claim 6, wherein the performing of the point density analysis includes generating an overlay of points on the arrow marking in the segmented image and measuring concentrations of the points in respective portions of the arrow marking.

8. The method of claim 7, wherein determining the arrow direction includes determining the arrow direction based on the measured concentrations of the points.

9. The method of claim 7, wherein determining the lane direction includes determining the lane direction based on a portion of the arrow marking having a greatest concentration of the points.

10. A system configured to detect a lane direction in a parking zone being navigated by a vehicle, the system comprising:
   at least one image capture device configured to capture at least one image of an environment surrounding the vehicle, wherein the at least one image includes an arrow marking on a ground surface of the parking zone; and a computing system configured to generate a top-down image of the environment surrounding the vehicle based on the captured at least one image, wherein the top-down image includes the arrow marking, perform an image analysis of the top-down image to determine an arrow direction of the arrow marking, detect, based on results of the image analysis, the lane direction of a lane occupied by the vehicle based on the determined arrow direction, generate and provide an output indicating the lane direction of the lane occupied by the vehicle, and provide, to an autonomous driving system of the vehicle, an instruction to correct a driving direction of the vehicle and for the vehicle to move in that direction, which includes at least one of, responsive to the detected lane direction:

providing, to at least one of a driver of the vehicle and the autonomous driving system of the vehicle, a notification of the detected lane direction; and providing, to at least one of the driver of the vehicle and the autonomous driving system of the vehicle, a notification that a driving direction of the vehicle is incorrect.

11. The system of claim 10, wherein the generating of the top-down image includes performing inverse perspective projection (IPP) processing on the captured at least one image to generate the top-down image.

12. The system of claim 11, wherein the captured at least one image includes a plurality of captured images, and the performing of the IPP processing includes generating the top-down image using the plurality of captured images.

13. The system of claim 12, wherein the plurality of captured images includes at least four of the captured images corresponding to a front view, a rear view, and left and right views of the environment surrounding the vehicle.

14. The system of claim 10, wherein the performing of the image analysis of the top-down image includes performing segmentation of the top-down image to generate a segmented image that identifies the arrow marking.

15. The system of claim 14, wherein the performing of the image analysis further includes performing a point density analysis of the arrow marking.

16. The system of claim 15, wherein the performing of the point density analysis includes generating an overlay of points on the arrow marking in the segmented image and measuring concentrations of the points in respective portions of the arrow marking.

17. The system of claim 16, wherein determining the arrow direction includes determining the arrow direction based on the measured concentrations of the points.

18. A processor configured to execute instructions stored on a non-transitory computer-readable medium, wherein executing the instructions causes the processor to:

capture at least one image of an environment surrounding a vehicle navigating a parking zone, wherein the at least one image includes an arrow marking on a ground surface of the parking zone;

generate a top-down image of the environment surrounding the vehicle based on the captured at least one image, wherein the top-down image includes the arrow marking;

perform an image analysis of the top-down image to determine an arrow direction of the arrow marking;

detect, based on results of the image analysis, a lane direction of a lane occupied by the vehicle based on the determined arrow direction;

generate and provide an output indicating the lane direction of the lane occupied by the vehicle; and provide, to an autonomous driving system of the vehicle, an instruction to correct a driving direction of the vehicle and for the vehicle to move in that direction, which includes at least one of, responsive to the detected lane direction:

providing, to at least one of a driver of the vehicle and the autonomous driving system of the vehicle, a notification of the detected lane direction; and providing, to at least one of the driver of the vehicle and the autonomous driving system of the vehicle, a notification that a driving direction of the vehicle is incorrect.

* * * * *